United States Patent [19]

Soejima

[11] Patent Number: 4,982,392
[45] Date of Patent: Jan. 1, 1991

[54] STABILIZED OPTICAL PICK-UP DEVICE INHIBITING THE EFFECT OF THE FOCUS ERROR SIGNAL AT THE START AND END OF A DATA REGION

[75] Inventor: Toshiyuki Soejima, Atsugi, Japan
[73] Assignee: Ricoh Company, Ltd., Tokyo, Japan
[21] Appl. No.: 216,891
[22] Filed: Jul. 8, 1988
[30] Foreign Application Priority Data
  Jul. 10, 1987 [JP]  Japan .................................. 62-171149
  Jan. 25, 1988 [JP]  Japan .................................. 63-12631
[51] Int. Cl.$^5$ .............................................. G11B 7/00
[52] U.S. Cl. ................................ 369/44.25; 369/44.26; 369/44.33; 369/44.35
[58] Field of Search ................... 369/44, 45, 46, 44.25, 369/44.26, 44.35, 44.36, 44.33; 250/201.5

[56] References Cited
U.S. PATENT DOCUMENTS
4,535,431  8/1985  Bricot et al. .......................... 369/44

4,669,072  5/1987  Miura et al. .......................... 369/44
4,669,077  5/1987  Gerard et al. ......................... 369/46
4,700,334  10/1987 Shinkai ................................. 369/46
4,730,294  3/1988  Funada ................................. 369/46
4,748,610  5/1988  Nakata et al. ........................ 369/46

Primary Examiner—Donald McElheny, Jr.
Attorney, Agent, or Firm—Cooper & Dunham

[57]  ABSTRACT

An optical pick-up device for use in an optical information recording/reproducing apparatus carries out a focusing and tracking control operation to keep the optical pick-up device located in a desired location relative to an associated optical disc. In accordance with the present invention, the focusing or tracking control operation is temporarily inhibited for a predetermined time period immediately after the initiation of recording of data to the optical disc and immediately after the termination of recording of data to the optical disc if a focusing or tracking error signal has been detected to exceed a predetermined range.

13 Claims, 9 Drawing Sheets

STABILIZED OPTICAL PICK-UP DEVICE INHIBITING THE EFFECT OF THE FOCUS ERROR SIGNAL AT THE START AND END OF A DATA REGION

BACKGROUND OF THE INVENTION

1. Field of the Invention

This invention generally relates to an optical information recording and reproducing apparatus and in particular to an optical pick-up device for use in such an optical information recording and reproducing apparatus. More specifically, the present invention relates to a control system for controlling the operation of such an optical pick-up device.

2. Description of the Prior Art

An optical disc recording and reproducing apparatus using an optical disc as a medium for storing information is drawing much attention in the recent years. Such an optical disc recording and reproducing apparatus typically includes an optical disc, which is rotatably supported and driven to rotate in a predetermined direction, an optical pick-up device, which is provided to be movable relative to the optical disc in the radial direction of the optical disc as well as in the direction perpendicular to the recording surface of the optical disc, and means for moving the optical pick-up device relative to the optical disc so as to carry out focusing and tracking controls. In such an optical disc, a recording track having a track width in the order of 1 micron is formed on its data recording surface at a track pitch in the order of 2 microns. And, a laser beam having a spot size in the order of 1 micron is projected onto the recording track of the optical disc. With the optical disc in rotation, in a recording mode, the light intensity of the laser beam applied to the optical disc is modulated in accordance with the data to be recorded on the optical disc to thereby have the data recorded on the optical disc. On the other hand, in a reading mode, the variation of the light intensity of the light reflecting from the recording surface of the optical disc is detected to reproduce the stored data.

Figure 7A:
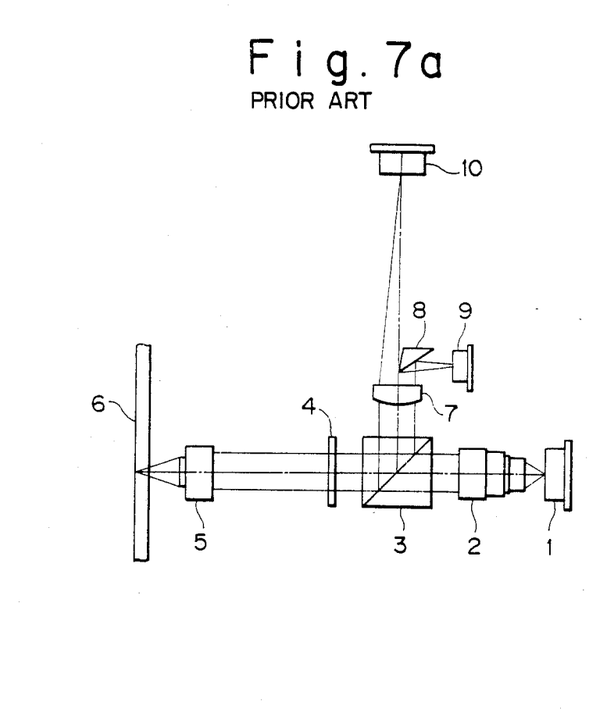
FIG. 7a is a schematic illustration showing the overall structure of a typical optical pick-up device.

As described above, the optical pick-up device is moved relative to the optical disc so as to cause the laser spot to track the recording track of the optical disc and to cause the laser spot to have a predetermined size at the recording surface of the optical disc. For this purpose, the optical pick-up device produces focusing and tracking error signals for carrying out a servo control of the optical pick-up device as well as a data reproduction signal for reproducing the recorded data. The overall structure of a typical optical pick-up device is illustrated in FIG. 7a. In the illustrated example, the focusing action of a laser beam is carried out using the knife edge method. Described more in detail, a laser beam emitted from a laser diode or semiconductor laser device 1 is collimated by a coupling lens 2 and the thus collimated laser beam passes through a polarization beam splitter 3 and then through a quarter wavelength plate 4 where the laser beam is polarized. Then, the laser beam passing through the quarter wavelength plate 4 passes through an objective lens 5 to be focused onto a recording track defined on the recording surface of an optical disc 6.

Figure 7B:
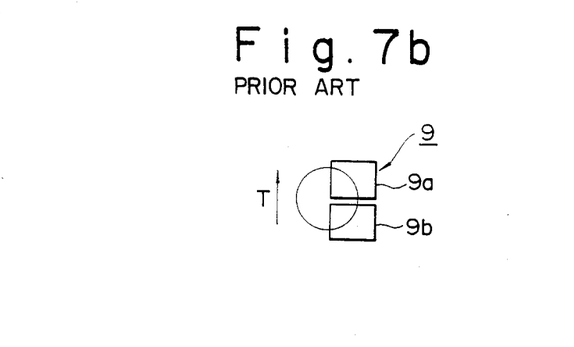

The light reflecting from the optical disc 6 again passes through the objective lens 5, this time in the reversed direction, and then through the quarter wavelength plate 4 where the plane of polarization is varied. As a result, the light entering into the beam splitter 3 after reflection from the optical disc 6 is reflected upwardly toward a lens 7. After passing through the lens 7, a half of the light is reflected by a prism 8 which also defines a knife edge, and, as shown in FIG. 7b, the light reflected by the prism 8 focuses upon a tracking servo control light receiving device 9 having a pair of light receiving surfaces arranged in the tracking direction T. On the other hand, the remaining half of the light focused on a focusing servo control light receiving device 10 having a pair of light receiving surfaces arranged side-by-side with respect to a straight line in parallel with the knife edge of the prism 8. That is, the pair of light receiving surfaces of the light receiving device 10 is arranged in the direction of advancement of the recording track of the optical disc 6.

Although not shown specifically in FIG. 7a, the optical pick-up device also includes a tracking mechanism for positioning the objective lens 5 relative to the optical disc 6 in the radial direction and also a focusing mechanism for positioning the objective lens 5 relative to the optical disc 6 in a direction perpendicular to the recording surface of the optical disc 6. In the present specification, for the sake of convenience, the term "objective lens moving mechanism" will be used as a mechanism which is a combination of both of tracking and focusing mechanisms.

Then, with the help of a servo control unit which is not shown, based on a difference between output signals from the two light receiving surfaces 9a and 9b of the light receiving device 9, a positional (tracking) error of the laser beam on the surface of the optical disc 6 is detected. And, the tracking mechanism is controlled in accordance with such a tracking error to move the objective lens 5 so as to keep the positional discrepancy between a recording track of the optical disc 6 and the projected laser beam as small as possible. On the other hand, a focusing error signal of the laser beam is detected in the following manner. When the projected laser beam is properly focused on the optical disc 6, the position of convergence of the laser beam passing through the lens 7 agrees with the position of demarcation between the pair of light receiving surfaces 10a and 10b of the light receiving device 10, so that each of the pair of light receiving surfaces 10a and 10b receives the same amount of light.

Figure 8A:
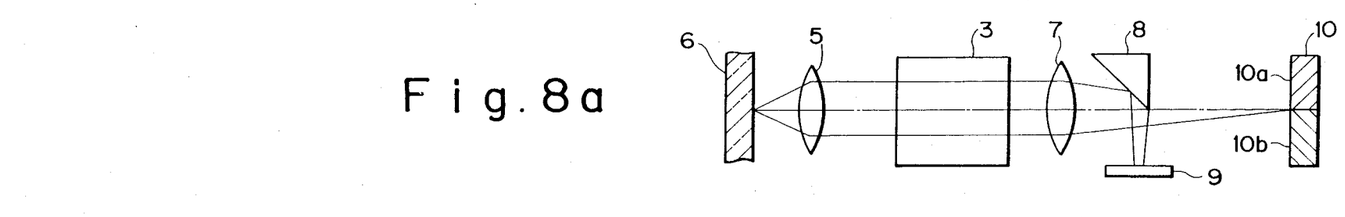
FIGS. 8a through 8c are schematic illustrations showing the principle of a focusing control operation.
Figure 8B:
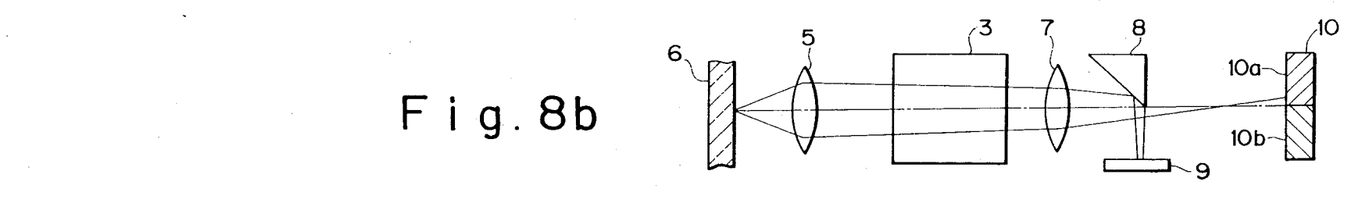
Figure 8C:
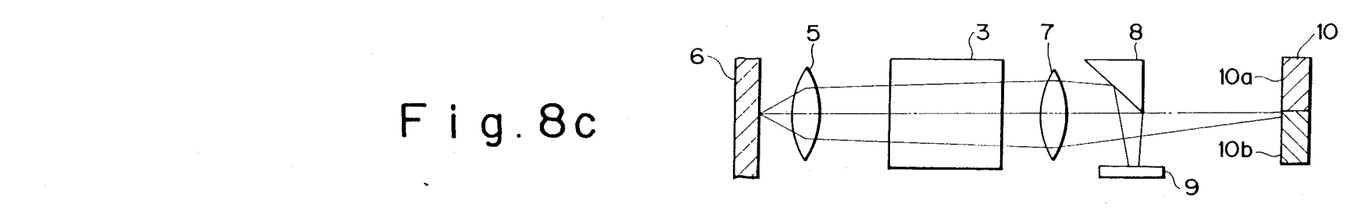

When the optical disc 6 is shifted further away from the objective lens 5 as shown in FIG. 8b, the position of convergence of the laser beam from the lens 7 is located between the lens 7 and the light receiving device 10, so that the light receiving surface 10a receives more light than the light receiving surface 10b. On the other hand, when the optical disc 6 is shifted closer to the objective lens 5 as shown in FIG. 8c, the position of convergence of the laser beam from the lens 7 is located behind the light receiving device 10, so that the light receiving surface 10a receives less light than the light receiving surface 10b. As a result, based on a difference in the amount of light received by the pair of light receiving surfaces 10a and 10b, there may be produced a focusing error signal. And, the focusing mechanism is controlled so as to minimize such a focusing error by means of the servo control unit which is not shown, whereby the objective lens 5 is caused to move so as to minimize the focus error of the laser beam impinging upon the recording track of the optical disc 6. In addition, output signals from the pair of light receiving surfaces 9a and 9b are combined with output signals from the pair of light receiving surfaces 10a and 10b to reproduce data recorded on the optical disc 6.

Figure 9A:
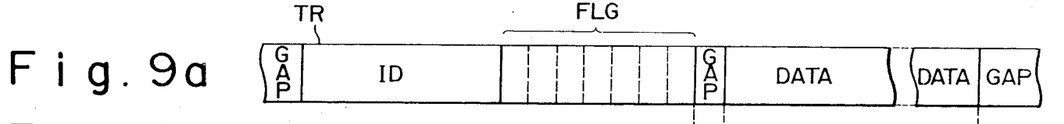
FIG. 9a is a schematic illustration showing the structure of a recording sector provided in an optical disc.

The recording track on the optical disc 6 is segmented into sectors in order to carry out recording and/or reproducing of data efficiently. As shown in FIG. 9a, one such sector includes an identification signal region ID, in which a sector address or the like for indicating its identity is provided, a flag region FLG for storing a flag indicating the status of its sector, such as presence of recorded data or defective sector, and a data region DATA for storing data for this sector. And, the flag region FLG and the data region DATA are separated from each other by a gap GAP. Sectors are arranged along the recording track TR such that they are separated from one another by a gap GAP between the two. Typically, the recording track TR is a continuous groove formed on the recording surface of the optical disc 6 in the form of a spiral, and such a track is typically formed by using a stamper. However, during the manufacture of such an optical disc 6, depending on the condition of the stamper, there is produced a variation or scatter in the depth of the recording track TR and such a scatter can be a cause for varying the efficiency of reflection locally.

Figures 10A, 10B:
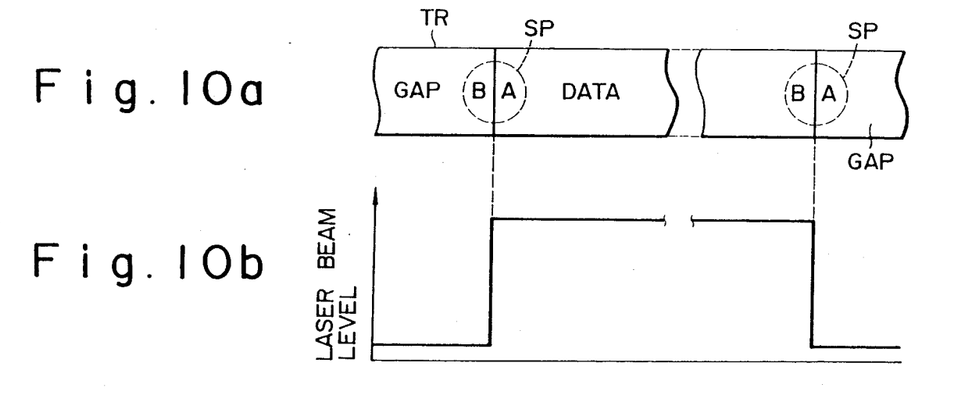
FIGS. 10a and 10b are schematic illustrations showing how a focusing error signal may be produced.

If such a variation in the efficiency of reflection is present in the gap region GAP at the beginning or end of the data region DATA, the following problem could happen at the time of recording data. That is, during recording of data, the light intensity of a laser beam is increased nearly to ten times of that at the time of reproduction of data in order to vary the efficiency of reflection of the recording medium. Thus, when the light intensity of the laser beam is changed to the recording level at the beginning of the data region DATA, a laser spot SP of the laser beam extends between the gap GAP and the data region DATA as shown in FIG. 10a. Accordingly, the leading portion A of the laser spot SP is located in the data region DATA and the remaining portion B of the laser spot SP is located in the gap GAP.

Figure 9B:
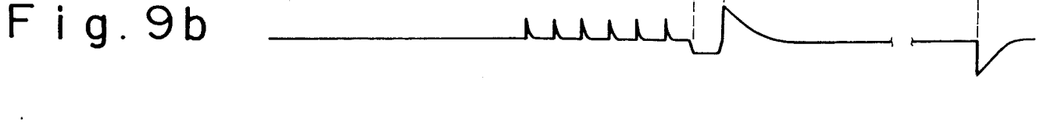
FIG. 9b is an illustration showing how the level of focusing error signal varies along the longitudinal line of the recording sector.

On the other hand, the light reflecting from the portion A of the laser spot SP impinges upon the light receiving surface 10a of the light receiving device 10 and the light reflecting from the portion B of the laser spot SP impinges upon the light receiving surface 10b. Thus, as described above, depending on a difference between the output signals from the respective light receiving surfaces 10a and 10b, there is produced a focusing error signal as shown in FIG. 9b. For this reason, if the rate of reflection is lower at the gap GAP than at the data region DATA, the light receiving surface 10a receives more light than the light receiving surface 10b at the time of initiation of recording data, so that the level of the focusing error signal becomes significantly large. As a result, the focusing error means erroneously determines that the focusing error has increased to thereby move the focusing mechanism though the in-focus condition is, in fact, present. In this case, malfunctioning in focusing control takes place. A similar erroneous focusing operation takes place due to the similar reason in the case where the rate of reflection is decreased at the gap GAP at the end of the data region DATA.

In some of the optical pick-up devices, the dividing line between the pair of light receiving surfaces 9a and 9b extends in parallel with the edge of the beam splitting prism 8 similarly with the light receiving device 10, and in such a case, the malfunctioning of tracking error control can take place.

SUMMARY OF THE INVENTION

In accordance with the principle of the present invention, a system is structured to inhibit a focusing and/or tracking error control operation temporarily when the focusing and/or tracking error signal exceeds a predetermined level during a predetermined time period immediately after the initiation of and/or immediately before the completion of recording data.

It is therefore a primary object of the present invention to obviate the disadvantages of the prior art as described above and to provide an improved optical pick-up device suitable for use in an optical information recording and reproducing apparatus.

Another object of the present invention is to provide an improved optical pick-up device reliable and stable in operation.

A further object of the present invention is to provide an improved optical pick-up device capable of preventing erroneous focusing and/or tracking control operation from happening.

A still further object of the present invention is to provide an improved focusing/tracking control system for use in an optical pick-up device.

Other objects, advantages and novel features of the present invention will become apparent from the following detailed description of the invention when considered in conjunction with the accompanying drawings

BRIEF DESCRIPTION OF THE DRAWING

FIG. 7b is a schematic illustration showing the detailed structure of the tracking error detecting light receiving device 9 provided in the optical pick-up device of FIG. 7a;

DESCRIPTION OF THE PREFERRED EMBODIMENTS

Figure 1:
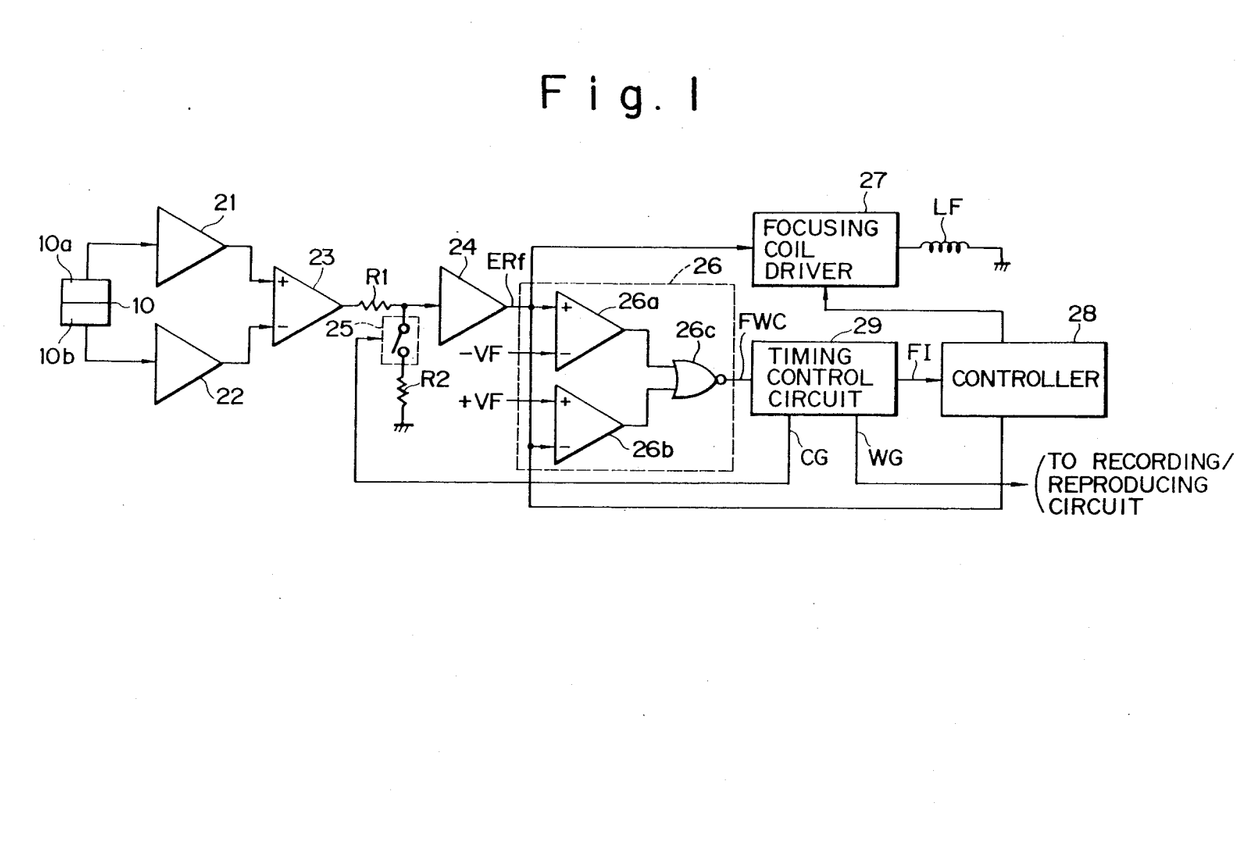
FIG. 1 is a schematic illustration showing a focusing control system for use in an optical pick-up device constructed in accordance with one embodiment of the present invention.

Referring now to FIG. 1, there is shown the overall structure of a focusing control system of an optical pick-up device for use in an optical information recording and reproducing apparatus. It is to be noted that the present focusing control system may be used in an optical pick-up device shown in FIG. 7a. As shown in FIG. 1, outputs from the light receiving surfaces 10a and 10b of the light receiving device 10 are supplied to the non-inverting and inverting input terminals of a differential amplifier 23, respectively, through respective current-/voltage conversion amplifiers 21 and 22. The differential amplifier 23 serves to produce a focusing error signal as its output which is then input into an amplifier 24 through a resistor R1. The resistor R1 defines a voltage divider together with a resistor R2 and an analog switch 25 having a normally closed contact. The voltage dividing ratio of this voltage divider is set in accordance with the ratio of light levels between a data recording mode and a data reproduction mode. An output from the amplifier 24 is supplied as a focusing error signal ERf to a window comparator 26, a focusing coil driver 27 and a controller 28.

The window comparator 26 serves to detect whether the level of the focusing error signal ERf exceeds a predetermined range, and it includes a comparator 26a for detecting when the focusing error signal ERf drops below a lower limit −VF, a comparator 26b for detecting when the focusing error signal ERf exceeds beyond an upper limit +VF and a NOR circuit 26c having two input terminals which are connected to receive output signals from the comparators 26a and 26b. The NOR circuit 26c has its output terminal connected to supply its output signal FWC to a timing control circuit 29. The timing control circuit 29 produces a record gate signal WG for setting a data recording timing, a gain signal CG for adjusting the gain of a focusing error signal, and a focusing control inhibit signal FI for inhibiting a focusing control operation, and the timing control circuit 29 is so connected to supply its record gate signal WG to a data recording/reproducing circuit (not shown), its gain signal CG to the analog switch 25 and its focusing control inhibit signal FI to the controller 28.

In response to the focusing error signal ERf, the controller 28 controls the application of driving current to a focusing coil LF of a focusing coil driver unit 27 and the operation of the focusing coil driver unit 27 is inhibited when the focusing control inhibit signal FI has been input. The analog switch 25 is turned on or closed to lower the gain of the output signal of the differential amplifier 23 when the gain signal CG has been output. With this, the dynamic range of the focusing error signal ERf is maintained to be identical between a data recording mode and any other mode.

Figure 2:
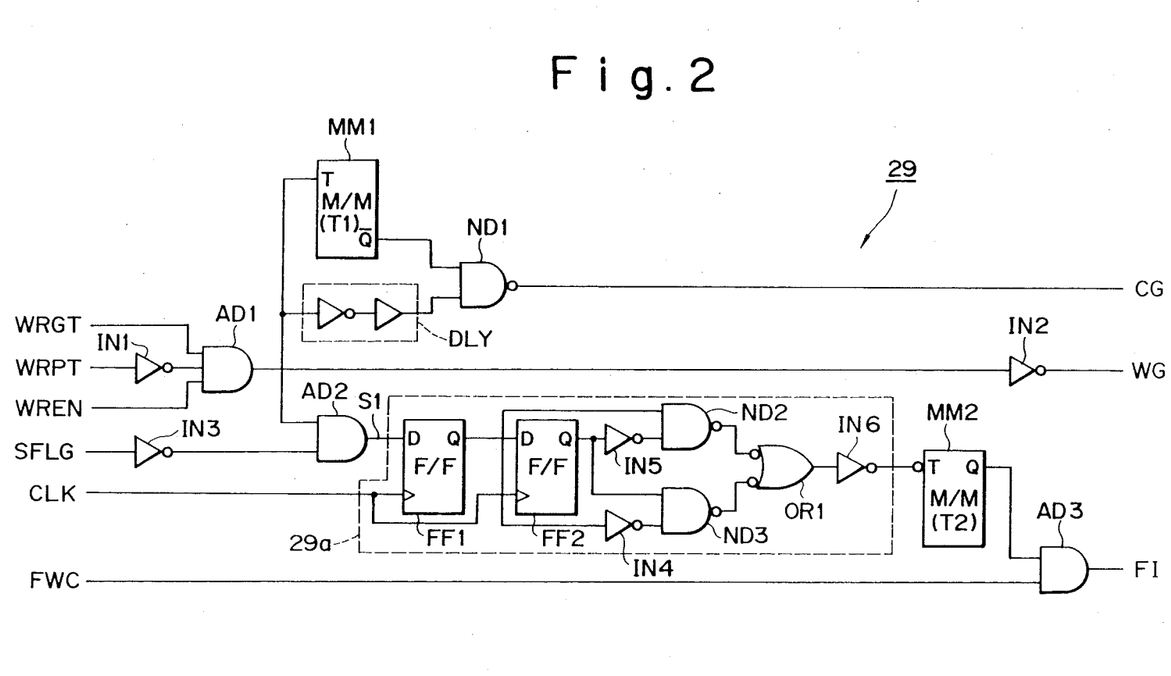
FIG. 2 is a schematic illustration showing the detailed structure of a timing control circuit suitable for use in the focusing control system of FIG. 1.
Figure 3A:
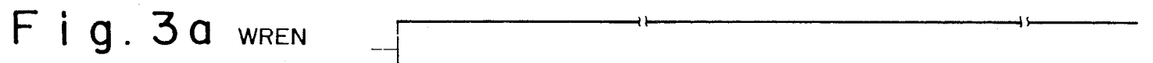
FIGS. 3a through 3f are timing charts which are useful for explaining the production of a gain signal.
Figure 3B:
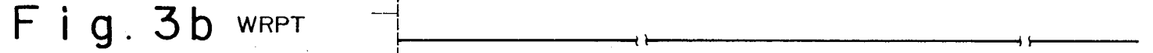
Figure 3C:
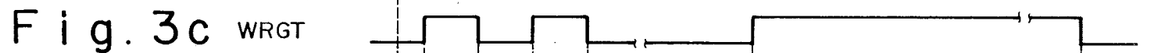
Figure 3D:
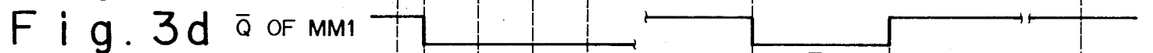
Figure 3E:
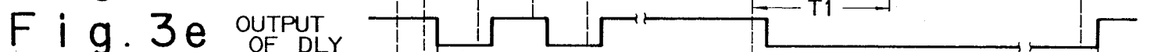
Figure 3F:
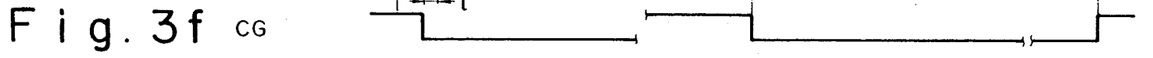
Figure 4A:
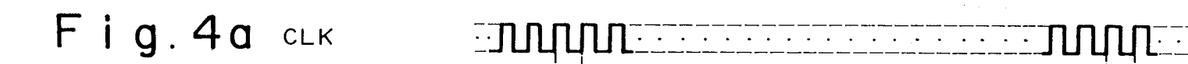
FIGS. 4a through 4k are timing charts which are useful for explaining the operation of a data recording initiation termination detecting circuit.
Figures 4B, 4C, 4D, 4E, 4F, 4G, 4H:
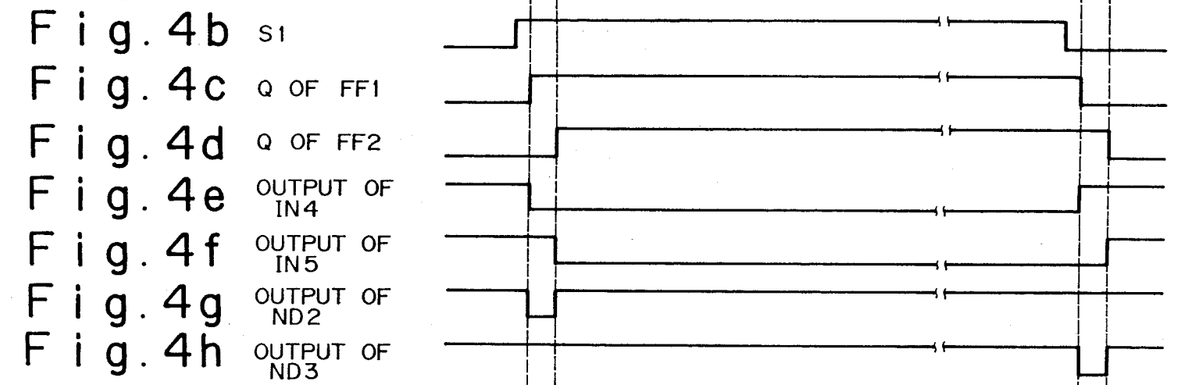
Figures 4I, 4J, 4K:
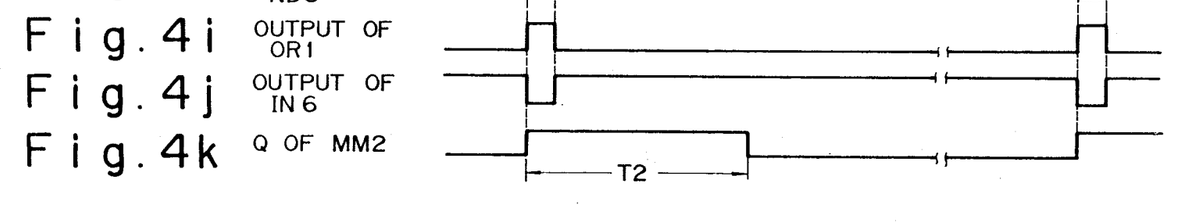
Figure 5A:
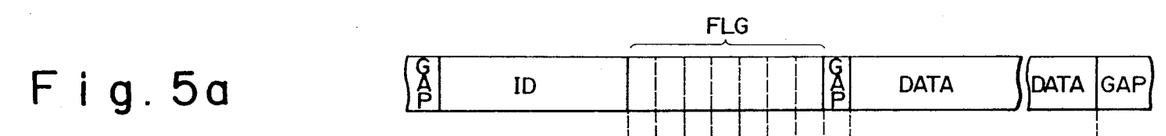
FIGS. 5a through 5a are timing charts which are useful for explaining the operation of the focusing control system shown in FIG. 1.
Figures 5B, 5C:
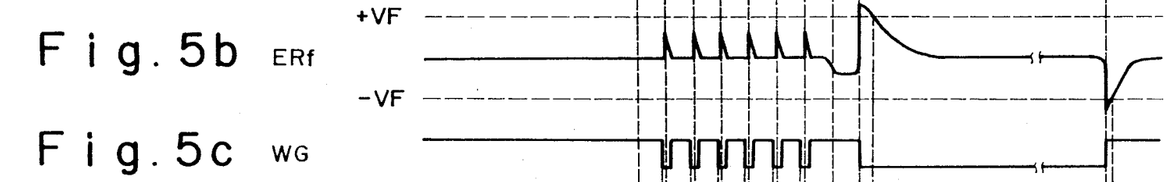
Figure 5D:
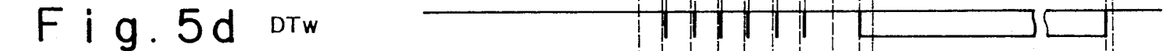
Figure 5E:
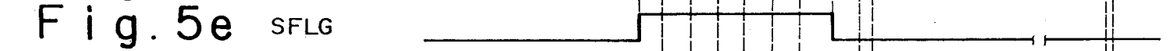
Figure 5F:
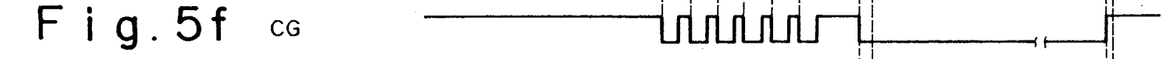
Figure 5G:
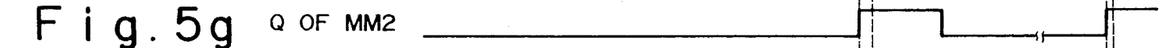
Figure 5H:
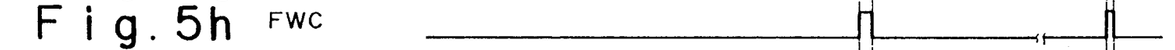
Figure 5I:
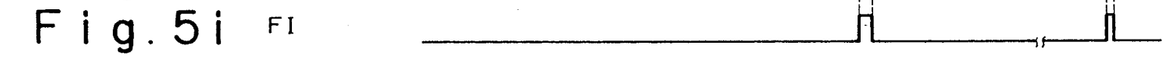

The detailed structure of one example of the timing control circuit 29 is illustrated in FIG. 2. A record gate signal WRGT for setting timing of recording data and a record enable signal WREN for setting data recording to be valid are applied to an AND circuit AD1, and furthermore a write inhibit signal WRPT indicating the fact that the optical disc 6 in use is in a write inhibt status is also applied to the AND circuit AD1 through an inverter IN1. It is to be noted that these record gate signal WRGT, record enable signal WREN and write inhibit signal WRPT are output from a system control unit which is not shown. An output signal from the AND circuit AD1 is applied to a trigger input terminal of a retriggerable mono-multivibrator MM1 having a pulse width T1, to a delay circuit DLY which inverts and delays an input signal over a predetermined time period t, and also to one input terminal of an AND circuit AD2. In addition, the output signal from the AND circuit AD1 is also inverted by an inverter IN2 and output as the record gate signal WG.

An inverted output terminal $\overline{Q}$ of the mono-multi MM1 and an output terminal of the delay circuit DLY are connected to the respective input terminals of a NAND circuit ND1 whose output terminal outputs the gain signal CG as its output signal. Accordingly, as shown in FIGS. 3a through 3f, in a data recording mode, when the write inhibit signal WRPT is in its logic L level, which indicates a write enable state, and also the record enable signal WREN is in its logic H level, the AND circuit AD1 is rendered operable, whereby the record gate signal WRGT is output through the AND circuit AD1. With this, at the rising edge of the record gate signal WRGT, the mono-multi MM1 is triggered so that a pulse signal having the pulse width T1 is output from the inverted output terminal $\overline{Q}$. And, when the rising edge of the record gate signal WRGT is repeated at an interval shorter than the pulse width T1, the mono-multi MM1 is triggered each time so that outputting of a signal from the inverted output terminal $\overline{Q}$ continues.

On the other hand, the output signal of the delay circuit DLY is a signal which is obtained by inverting an output signal from the AND circuit AD1 and having its inverted signal delayed over a time period t. Thus, the gate signal CG maintains its logic L level during a time period in which data is recorded on the optical disc 6 by the present optical pick-up device.

A flag region signal SFLG which indicates the fact that the laser beam is located in a flag region FLG is applied to the remaining input terminal of the AND circuit AD2 through an inverter IN3. The flag region signal SFLG is output from the system control unit. Thus, the AND circuit AD2 is enabled when the flag region signal SFLG is not output, and an output signal of the AND circuit AD1 under the condition is applied to a data record initiation/termination detection circuit 29a as a signal S1 through the AND circuit AD2. At the data record initiation/termination detection circuit 29a, a flip-flop FF1 stores the signal S1 in synchronism with a clock signal CLK and a flip-flop FF2 stores the state one clockbefore that of the flip-flop FF1. An output from the flip-flop FF1 is applied to one input terminal of a NAND circuit ND2 and also to one input terminal of another NAND circuit ND3 after having been inverted by an inverter IN4. In addition, an output from the flip-flop FF2 is applied to the remaining input terminal of the NAND circuit ND3 and also to the remaining input terminal of the NAND circuit ND2 after having been inverted by an inverter IN5.

Outputs from the NAND circuits ND2 and ND3 are input into an OR circuit OR1 of negative logic, whose output is supplied to a trigger input terminal (negative logic) of a mono-multivibrator MM2, which outputs a pulse signal of pulse width T2, as an output signal of the data recording initiation/termination circuit 29a through an inverter IN6. An output terminal of the mono-multi MM2 is connected to one input terminal of an AND circuit AD3. The remaining input terminal of the AND circuit AD3 is connected to receive an output signal FWC from the window comparator 26.

Thus, when the laser beam is located other than the flag region FLG and the record gate signal WRGT is output for recording data, i.e., when recording data in the data region DATA, if the status of the flip-flop FF1 is changed to logic H level by the output of clock signal CLK immediately after the rising edge of signal S1, both of the output of flip-flop FF1 and the output of inverter IN5 become logic H level, as shown in FIGS. 4a through 4k, so that the output of NAND circuit ND2 drops to logic L level during one clock. And, when the status of flip-flop FF1 changes to logic L level by the output of clock signal CLK immediately after the lowering edge of signal S1, both of the output of inverter IN4 and the output of the flip-flop FF2 become logic H level, and, thus, the output of NAND circuit ND3 is pulled down to logic L level during one clock. Thus, in synchronism with the clock signal immediately after the rising edge of and immediately after the lowering edge of signal S1, the output signal of data record initiation/termination detecting circuit 29a is pulled down temporarily. As a result, the mono-multivibrator MM2 is triggered once immediately after the initiation of recording of data in the data region DATA and also once immediately after the termination of such recording. And, utilizing such timing, the AND circuit AD3 is enabled for a time period having pulse width T2.

Therefore, if the signal FWC is output because the level of focusing error signal ERf has been determined to exceed a predetermined range by the window comparator 26, the signal FWC is output to the controller 28 as a focusing control inhibit signal FI through the AND circuit AD3.

When recording data on the optical disc 6 with the above-described structure, if the signal recorded in the identification signal region ID is reproduced to indicate that it is an intended sector, the system control unit outputs a record gate signal WRGT and a flag region signal SFLG in order to record a predetermined flag data in the flag region FLG. With this, the timing control circuit 29 outputs a record gate signal WG, and, while the record gate signal WG is being output, record data DTw is output from a recording/reproducing circuit and thus the flag data is recorded on the optical disc 6 by the present optical pick-up device. In this case, the gain signal CG is output for a longer period of time than that of the record gate signal WG by the timing control circuit 29 to have the analog switch 25 turned on. Thus, at least during a time period in which the level of the laser beam is increased for recording of the flag data, the gain of the focusing error signal is lowered.

Next, in order to record data in the data region DATA, the system control unit outputs a record gate signal WRGT with the flag region signal SFLG pulled down. With this, from the timing signal 29, a record gate signal WG is output and a gain signal CG is also output for a time period somewhat longer than that of the record gate signal WG. Similarly as described above, record data DTw is output from the recording/reproducing circuit to carry out recording of data onto the optical disc 6 by the present optical pick-up device and the gain of the focusing error signal is switched. Moreover, in this case, the data record initiation/termination detecting circuit 29a of the timing control circuit 29 is enabled, and, as described above, the mono-multi MM2 is triggered in synchronism with data recording initiation timing and data recording termination timing to enable the AND circuit AD3.

If the rate of reflection of the gap GAP before and after the data region DATA is low and the focusing error signal ERf becomes very large to exceed the upper limit $+VF$ and the lower limit $-VF$ immediately after the initiation of and termination of recording of data to the data region DATA, the window comparator 26 outputs a signal FWC. And, the signal FWC is output to the controller 28 as a focusing control inhibit signal FI through the AND circuit AD3. With this, the controller 28 inhibits the operation of the focusing coil driver unit 27 to thereby prevent the focusing mechanism from carrying out an erroneous control operation by the focusing error signal ERf which increases temporarily. In this manner, in accordance with the present embodiment, during recording of data, even if the focusing error signal increases temporarily, the focusing mechanism is prevented from executing an erroneous control operation.

Figure 6:
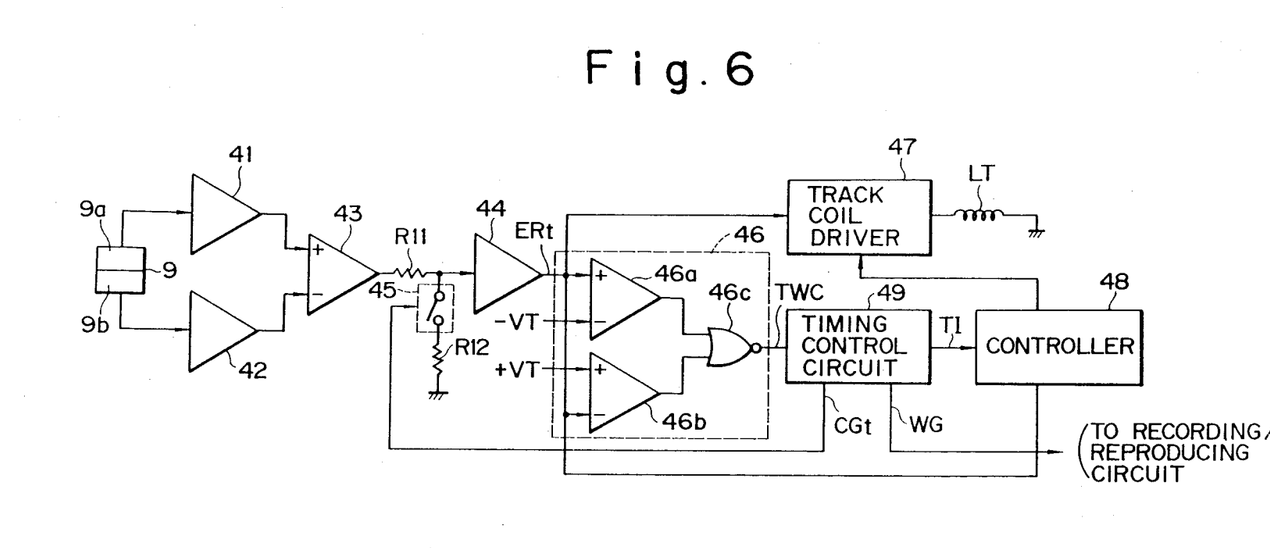
FIG. 6 is a schematic illustration showing a tracking control system for use in an optical pick-up device constructed in accordance with another embodiment of the present invention.

FIG. 6 illustrates a tracking control system for use in an optical pick-up device constructed in accordance with another embodiment of the present invention. The present embodiment is to be applied for the case in which the demarcation line between the pair of light receiving surfaces of the light receiving device 10 for detecting a tracking error signal extends in parallel with the edge of the beam splitting prism 8 similarly with the light receiving device 9 in the optical pick-up device shown in FIG. 7a. The basic structure of the present embodiment is similar to that of the focusing control system shown in FIG. 1.

As shown in FIG. 6, outputs from the light receiving surfaces 9a and 9b of the split type light receiving device 9 are supplied to the non-inverting and inverting input terminals of a differential amplifier 43 through respective current/voltage conversion amplifiers 41 and 42. The differential amplifier 43 supplies a tracking error signal as its output, which is supplied to an amplifier 44 through a resistor R11. The resistor R11 defines a voltage divider in combination with an analog switch 45 having a normally closed contact and a resistor R12. The ratio of voltage division is set depending on the ratio of light intensity levels between data recording mode and data reproduction mode.

An output signal of the amplifier 44 is supplied as a tracking error signal ERt to a window comparator 46, to a tracking coil driver unit 47 and also to a controller 48. The window comparator 46 serves to detect the fact that the level of the tracking error signal ERf exceeds a predetermined range, and it includes a comparator 46a for detecting the fact that the tracking error signal ERt becomes lower than lower limit $-VT$, a comparator 46b for detecting the fact that the tracking error signal ERt becomes larger than upper limit $+VT$ and a NOR circuit 46c having two input terminals for receiving outputs from the comparators 46a and 46b. And, the NOR circuit 46c supplies an output signal TWC which is supplied to a timing control circuit 49.

The timing control circuit 49 produces a record gate signal WG for setting the timing of recording data, a gain signal CGt for adjusting the gate of the tracking error signal and a tracking control inhibit signal TI for inhibiting the tracking control. The record gate signal WG is supplied to a data recording/reproducing circuit (not shown) and the gain signal CGt is supplied to the analog switch 45, and the tracking control inhibit signal TI is supplied to the controller 48. The timing control circuit 49 is structurally similar to the tracking control circuit 29 shown in FIG. 2, and thus its detailed description will be omitted.

The controller 48 controls the application of driver current to a tracking coil LT of a tracking coil driver unit 47 in accordance with the tracking error signal ERt, and the operation of the tracking coil driver unit 47 is inhibited when the tracking control inhibit signal TI has been input. The analog switch 45 is turned on upon outputting of the gain singal CGt to lower the gain of the output signal of the differential amplifier 43. With this, the dynamic range of the tracking error signal ERt is maintained at constant between data recording mode and any other mode.

With the above-described structure, when recording data on the optical disc 6, in a manner similar to the above-described embodiment, the analog switch 45 is turned on and off in synchronism with recording of data to adjust the gain of the tracking error signal, so that the tracking control can be carried out always under the same condition, which contributes to prevent any malfunctioning in tracking control from occurring. In addition, since the tracking control inhibit signal TI is output to the controller 48 immediately after the initiation of and immediately after the completion of recording data to the data region DATA, an erroneous tracking control operation due to a temporary increase of the tracking error signal ERt may be prevented from occurring.

As described above, in accordance with the present invention, since any erroneous focusing and/or tracking control operation which could occur immediately after the initiation of and immediately after the completion of recording of data to the data region DATA can be prevented from taking place, the focusing and/or tracking operation can be carried out stably at all times irrespective of the operating condition of an optical pick-up device. That is, in accordance with the present invention, if a focusing or tracking error signal exceeds a predetermined range during a predetermined time period immediately after the initiation of and immediately after the completion of recording of data, the focusing or tracking control operation is temporarily inhibited. And, thus, any erroneous focusing or tracking operation may be prevented from taking place.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for controlling the operation of an optical pick-up device for recording data to and/or reproducing data form a selected region of a recording track formed on an optical recording medium by irradiating said medium with a light beam, comprising the steps of detecting whether or not a focusing error is outside a predetermined range and producing a detection signal related thereto and carrying out focusing of said light beam on said recording medium in accordance with said detection signal, and inhibiting said focusing if said detection signal indicates that the focusing error is outside the predetermined range when said detection signal is being output from said detecting means during predetermined time periods at the start and at the end of said selected region of the track.

2. The method of claim 1 wherein said optical recording medium is an optical disc which is rotatably supported and said recording track is a spiral track formed on a writing surface of said optical disc.

3. The method of claim 2 wherein said focusing is carried out by moving said optical pick-up device either closer to or further away from said optical disc in a direction perpendicular to a plane defined by said writing surface of said optical disc.

4. A method for controlling the operation of an optical pick-up device for recording data to and/or reproducing data from selected regions of a recording track formed on an optical recording medium by irradiating said medium with a light beam, comprising deriving a tracking error signal and detecting whether or not a tracking error represented by said tracking error signal is outside a predetermined range and for generating a detection signal related thereto, carrying out a tracking control operation of said light beam relative to said optical recording medium and and inhibiting said tracking control operation if said detection signal indicates that the tracking error is outside the predetermined range when said detection signal is being output from said detecting means during a predetermined time period which starts at the start or the end of any one of said selected regions of said optical recording medium.

5. The method of claim 4 wherein said optical recording medium is an optical disc which is rotatably supported and said recording track is a spiral formed on a writing surface of said optical disc.

6. The method of claim 5 wherein said tracking control operation is carried out by moving said optical pick-up device radially relative to said optical disc.

7. A method of controlling the operation of an optical pick-up device for writing data on and/or reading data from a recording medium by irradiating said medium with a beam of radiant energy which is focused on and follows a track on said medium, including detecting the degree of focus of the beam on the medium and in response generating a focus detection signal, writing data on the medium with said pick-up device for a selected writing period and controlling the focus of said beam on the medium on the basis of said focus detection signal during said selected writing period but inhibiting said controlling at the start and at the end of said selected writing period if said focus detection signal departs from a selected focus threshold.

8. A method as in claim 7 including detecting the tracking of said track with said beam and in response generating a tracking detection signal, and controlling the tracking of said track with said beam on the basis of said tracking detection signal but inhibiting said controlling of said tracking at the start and at the end of said selected writing period if said tracking error signal departs from a selected tracking threshold.

9. A method as in claim 8 in which the data written on the medium during said selected writing period are written in data regions each of which is preceded and succeeded by respective gaps and said inhibiting takes place when said beam irradiates at least a part of one of said gaps.

10. A method as in claim 9 in which said medium is an optical disc having a recording surface and a spiral recording track on said recording surface.

11. A method of controlling the operation of an optical pick-up device for writing data on and/or reading data from a recording medium by irradiating said medium with a beam of radiant energy which follows a track on said medium, comprising detecting the tracking of said track with said beam and in response generating a tracking detection signal, writing data on the medium with said pick-up device for a selected writing period and controlling the tracking of said track with said beam on the basis of said tracking detection signal by inhibiting said controlling at the start and at the end of said selected writing period if said tracking detection signal departs from a selected tracking threshold at said start and said end of the selected waiting period.

12. A method as in claim 11 in which the data written on the medium during said selected writing period are written at selected data regions preceded and succeeded by respective gaps of data on the medium and said inhibiting takes place when said beam irradiates at least a part of one of said gaps.

13. A method as in claim 12 in which said medium is an optical disc having a recording surface and a spiral recording track on said recording surface.

* * * * *